(No Model.)

S. C. THOMPSON.
DRILL CHUCK.

No. 489,722. Patented Jan. 10, 1893.

WITNESSES:
Harry King
Albert A. Simpson

INVENTOR:
Sumner Chase Thompson
By Irving Utley
Attorney.

UNITED STATES PATENT OFFICE.

SUMNER CHASE THOMPSON, OF POUGHKEEPSIE, NEW YORK, ASSIGNOR OF ONE-HALF TO JOHN E. ADRIANCE, OF SAME PLACE.

DRILL-CHUCK.

SPECIFICATION forming part of Letters Patent No. 489,722, dated January 10, 1893.

Application filed May 28, 1892. Serial No. 434,767. (No model.)

*To all whom it may concern:*

Be it known that I, SUMNER CHASE THOMPSON, a citizen of the United States, residing at Poughkeepsie, in the county of Dutchess and State of New York, have invented certain new and useful Improvements in Drill-Chucks; and I do hereby declare the following to be a full, clear, and exact description of the invention, such as will enable others skilled in the art to which it appertains to make and use the same.

My invention relates to improvements in chucks for holding and driving drills and boring implements. Hitherto it has been necessary in using the ordinary drill chuck to stop the machine in order to change the bits in the chuck, thus causing the operator to lose much valuable time; it has also been required to use a wrench or operate a screw adjustment in order to set or release the bit; and it has usually been customary to provide separate supporting and driving devices for engagement with the bit head, thereby increasing the cost of the bits and the difficulty of their adjustment in the machine.

The object of my improvement is to meet these disadvantages by providing a simple, easily operated chuck which will enable the operator to quickly change the bits in the chuck without the stoppage or slowing up of the machinery; to dispense entirely with wrenches and screw adjustments; and to use the ordinary round bit head with no change, except the boring of a single hole in the shank somewhat deeper than the usual set screw depression, so that any such bit may be readily adapted to my chuck. I attain these advantages by the device illustrated in the accompanying drawings, in which—

Figure 1:
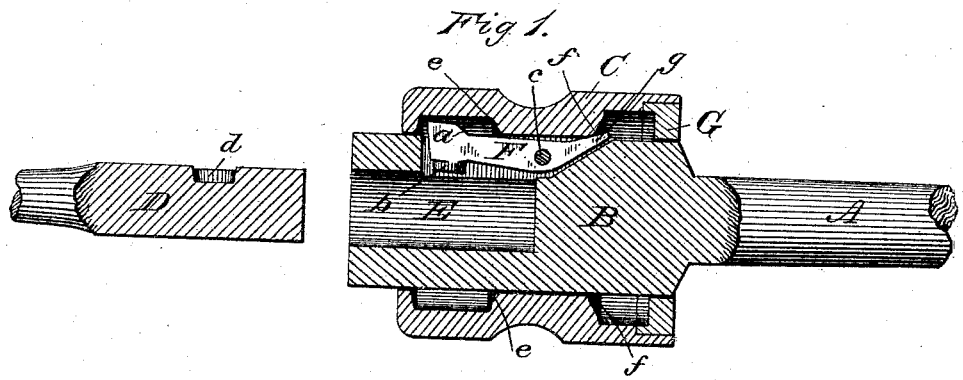
Figure 2:
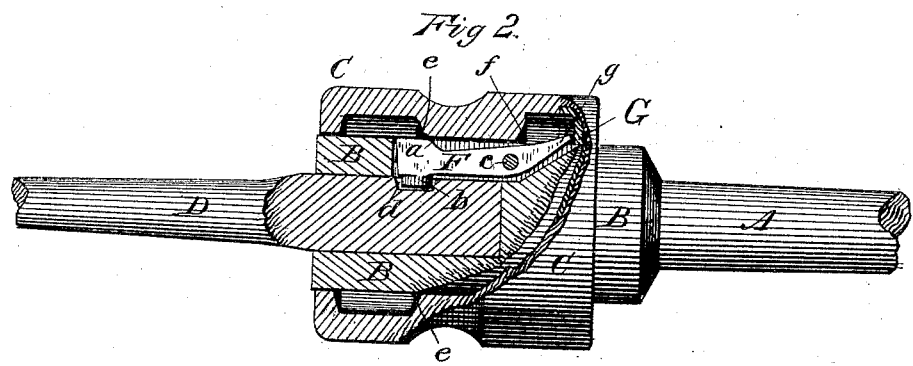
Figure 3:
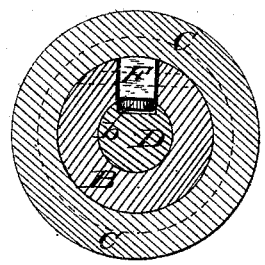

Figure 1 is a view showing the outer portions of the spindle and bit in side elevation, and the parts which embody the special features of my device, in axial section, to better indicate the relation of the various parts when the bit is detached from the spindle; Fig. 2 is a similar view, showing the changed position of the various parts when the bit shank is brought into place within the central bore of the spindle ready for use; and Fig. 3 is a transverse section of Fig. 2 cut through the adjustable set-pin to further show the relation of the parts, with the drill or auger-bit in place.

Similar letters refer to similar parts throughout the several views.

The ordinary spindle A has an enlarged portion or head B in which a central bore or recess E is made large enough to admit freely round bit-shanks of any desired size. Through one side of B is cut a slot opening into E, and adapted to receive a dog or catch F, pivoted to swing in B at $c$, and provided with tapering end $g$ and a blunt end $a$, having a projecting set-pin $b$. Around B is placed a freely rotating collar or sleeve C, the center of which has an interior diameter corresponding to the diameter of the spindle-head B. On either side of this central portion the collar C contains recesses of greater diameter into which respectively the ends $a$ and $g$ of the dog F may project beyond the spindle-head B as the rotating collar C, is moved axially in its position upon B. The interior shoulders of the collar $e$ and $f$, and the adjacent shoulder of $a$, are slightly beveled so as to operate smoothly upon F. When the collar is moved so that $e$ abuts upon $a$, the set-pin $b$ is necessarily pressed within the recess E of the spindle head, $g$ being correspondingly raised into the recess of the collar, and when the collar is moved in the opposite direction so that its shoulder $f$, abuts against $g$ the set-pin is by a necessary, positive action raised to a level with the interior surface of the recess E. Thus either $a$ or $g$ must project through the slot beyond the outer circumference of the spindle-head B, and in order to mount the collar, and retain it in place when mounted, it is constructed with a removable ring G which serves to form an abutting shoulder against $g$ after the collar is in place.

D represents a round bit shank of a drill or auger having in it a depression $d$ of the same size and shape as the set-pin $b$, and located at a distance from the end of the shank corresponding with the distance from $b$ to the inner end of the recess E. From the drawings and the above description of the various parts it is evident that to insert the bit in the machine while the machine is in motion, the operator needs only to move the loosely mounted collar to the position shown in Fig. 1, and insert the bit D in the recess E, with the other hand. Then by moving the collar C toward the position shown in Fig. 2, the revolving spindle brings the set-pin $b$, almost instantly into engagement with $d$, the collar moves to the position of Fig. 2, and the tool is ready for use. To remove the bit this simple operation is reversed: the collar is moved to the position of Fig. 1, when the set-pin is raised by the certain, positive action of $f$, upon $g$, out of engagement with $d$, and the bit is instantly released, without the use of wrench or screw adjustment. It may be safely estimated, that, where frequent changes of bits are necessary, about one-third of the operator's working time is saved by this quick removal and insertion of the bit-shank without the stoppage of the machine.

It is apparent that the device herein illustrated and described is equally applicable for use in a horizontal or vertical position. For convenience in placing the figures of the drawings upon the sheet, the spindle has been represented horizontally, and if the chuck be operated in this position any well known means may be employed to hold the collar more firmly in place at any given position without preventing its ready adjustment by hand. But if the chuck is to be used only in a vertical position the weight of the collar is sufficient to keep the parts securely in place as shown in Fig. 2.

I do not confine myself to the precise form and mode of attachment of the adjustable dog F, shown in the drawings.

The invention consists especially in constructing a chuck having a collar loosely mounted and so actuating an adjustable dog that a set-pin is automatically brought into engagement with a depression in the bit shank, and will not only impart the necessary driving motion to the bit but will also serve to prevent its being pulled out of the chuck when the tool is withdrawn from the work, which construction permits the use of a round bit shank and the consequent insertion or removal of the tool without the stoppage of the machine.

What I claim, therefore, and desire to secure by Letters Patent, is—

1. A drill chuck consisting of a head containing an annular drill recess having a slot in its wall, a swinging dog provided with a pin located in said slot, and a collar surrounding said head and having in the center an interior diameter corresponding to that of the spindle head and containing on either side recesses of greater diameter, as and for the purpose specified.

2. In a drill chuck, a head containing an annular drill recess having a slot in its wall, a swinging dog provided with a pin located in said recess, and a sliding collar surrounding said head, constructed with recesses as described for inclosing and operating the dog; in combination with a bit shank, having a depression adapted to receive the pin of the swinging dog for the purpose of holding and driving said bit, as set forth.

In testimony whereof I affix my signature in presence of two witnesses.

SUMNER CHASE THOMPSON.

Witnesses:
C. W. H. ARNOLD,
IRVING ETING.